United States Patent
Devos et al.

(10) Patent No.: US 8,388,158 B2
(45) Date of Patent: Mar. 5, 2013

(54) APPLIANCE WITH AN IMPROVED SOLID STATE DEVICE LIGHTING

(75) Inventors: Richard Devos, Goshen, KY (US); Telema Harry, Louisville, KY (US)

(73) Assignee: General Electric Company, Schenecady, NY (US)

(*) Notice: Subject to any disclaimer, the term of this patent is extended or adjusted under 35 U.S.C. 154(b) by 109 days.

(21) Appl. No.: 12/818,272

(22) Filed: Jun. 18, 2010

(65) Prior Publication Data

US 2011/0309752 A1    Dec. 22, 2011

(51) Int. Cl.
    *F21V 33/00* (2006.01)
(52) U.S. Cl. ......... 362/92; 315/149; 315/250; 315/287
(58) Field of Classification Search .......... 362/92; 315/149, 250, 287
    See application file for complete search history.

(56) References Cited

U.S. PATENT DOCUMENTS

| | | | |
|---|---|---|---|
| 2005/0122060 A1* | 6/2005 | Yu et al. | 315/247 |
| 2007/0258240 A1* | 11/2007 | Ducharme et al. | 362/231 |
| 2008/0203936 A1 | 8/2008 | Mariyama et al. | |
| 2008/0265801 A1 | 10/2008 | Lee et al. | |
| 2009/0059560 A1* | 3/2009 | Hudis | 362/89 |
| 2009/0302779 A1* | 12/2009 | McKinney | 315/294 |
| 2010/0014276 A1* | 1/2010 | Jang | 362/92 |
| 2011/0279042 A1* | 11/2011 | Huang | 315/158 |

* cited by examiner

*Primary Examiner* — Evan Dzierzynski
(74) *Attorney, Agent, or Firm* — Global Patent Operation; Douglas D. Zhang

(57) ABSTRACT

An appliance includes a cabinet, a solid state lighting device assembly integrated in the cabinet, and a power controller coupled to the solid state lighting device assembly for supplying electrical power to the solid state lighting device lighting assembly. The power controller is configured to provide a pulse modulated power signal to the solid state lighting device assembly that has a duty cycle. Each solid state lighting device in the solid state lighting device assembly cycles on and off in accordance with duty cycle.

13 Claims, 5 Drawing Sheets

APPLIANCE WITH AN IMPROVED SOLID STATE DEVICE LIGHTING

BACKGROUND OF THE INVENTION

The present disclosure generally relates to appliances, and more particularly to an improved lighting system for an appliance.

Solid State Lighting (SSL) is an illumination and lighting technology used in a variety of applications. Appliances, such as refrigerators for example, utilize solid state lighting to provide both external and internal lighting, as well as for the illumination of, and presenting information on displays.

Solid state lighting devices are generally current driven devices. In the applications mentioned above, a constant current electrical supply is maintained and the intensity of the solid state lighting device is stable. However, the high light levels of these solid state lighting devices result in high power supply requirements and power usage. The high light levels and power consumption of these solid state lighting devices also generates large amounts of heat. The increased generation of heat in an appliance such as a refrigerator complicates thermal management issues, where a goal is to reduce the amount of heat dissipated by the various electrical components. It is thus desirable to be able to reduce heat generation and dissipation in an appliance resulting from the use of electrical and electronic components, such as solid state lighting devices. It would also be advantageous to reduce the energy usage and power consumption costs associated with the use of solid state lighting device lighting, while providing the same or a higher level of perceived light.

Accordingly, it would be desirable to provide a system that addresses at least some of the problems identified above.

BRIEF DESCRIPTION OF THE INVENTION

As described herein, the exemplary embodiments overcome one or more of the above or other disadvantages known in the art.

One aspect of the exemplary embodiments relates to an appliance. In one embodiment, the appliance includes a cabinet, a solid state lighting device assembly integrated in the cabinet, and a power controller coupled to the solid state lighting device assembly for supplying electrical power to the solid state lighting device assembly. The power controller is configured to provide a pulse modulated power signal to the solid state lighting device assembly. The pulse modulated power signal has a duty cycle, and each solid state lighting device in the solid state lighting device assembly cycles on and off in accordance with the duty cycle of the power signal.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
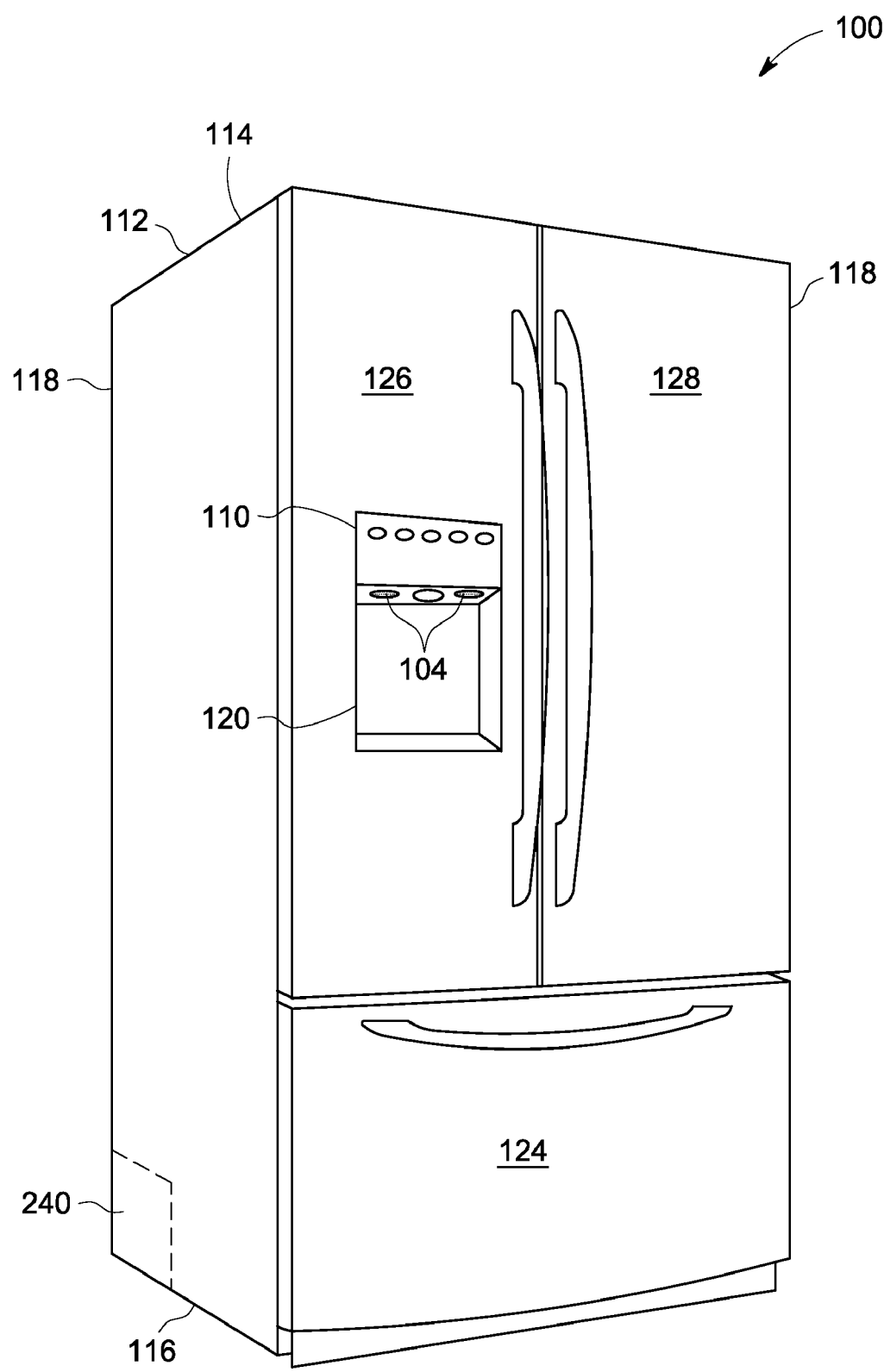
FIGS. 1 and 2 are perspective views of an exemplary appliance incorporating aspects of the disclosed embodiments.

Referring to FIG. 1, an exemplary appliance such as a refrigerator, incorporating aspects of the disclosed embodiments is generally designated by reference numeral 100. The aspects of the disclosed embodiments relate to lighting devices that can provide periodic light at frequencies that are generally faster than frequencies perceptible by the human eye. These devices include, but are not limited to, solid state lighting devices. Examples of solid state lighting devices include technologies such as light-emitting diodes ("LED's"), organic light-emitting diodes ("OLED's") polymer light-emitting diodes ("PLED's"). These general categories of solid state lighting devices will be referred to herein as "SSL" devices.

The aspects of the disclosed embodiments apply a duty cycle to the power control signal for a solid state lighting device assembly in an appliance. The application of a specific duty cycle can be used to reduce the overall power consumption with a slight reduction in perceived brightness of the solid state lighting device assembly. The power consumption per perceived Lumen of brightness is reduced, providing an improved efficiency. There is also a corresponding reduction in rejected and dissipated heat. In addition, an increase in peak emitted light level is developed, with limited heat dissipation, which is desirable in appliance applications where space is limited or heat dissipation is limited. For example, one application of a solid state device lighting assembly of the disclosed embodiments is in the insulated wall of a refrigerator, where the solid state device lighting assembly is in close proximity to insulating foam with limited heat conducting materials. The aspects of the disclosed embodiments will advantageously increase the perceived brightness of the solid state device lighting of the appliance, while reducing power consumption and thermal management issues.

Figure 3:
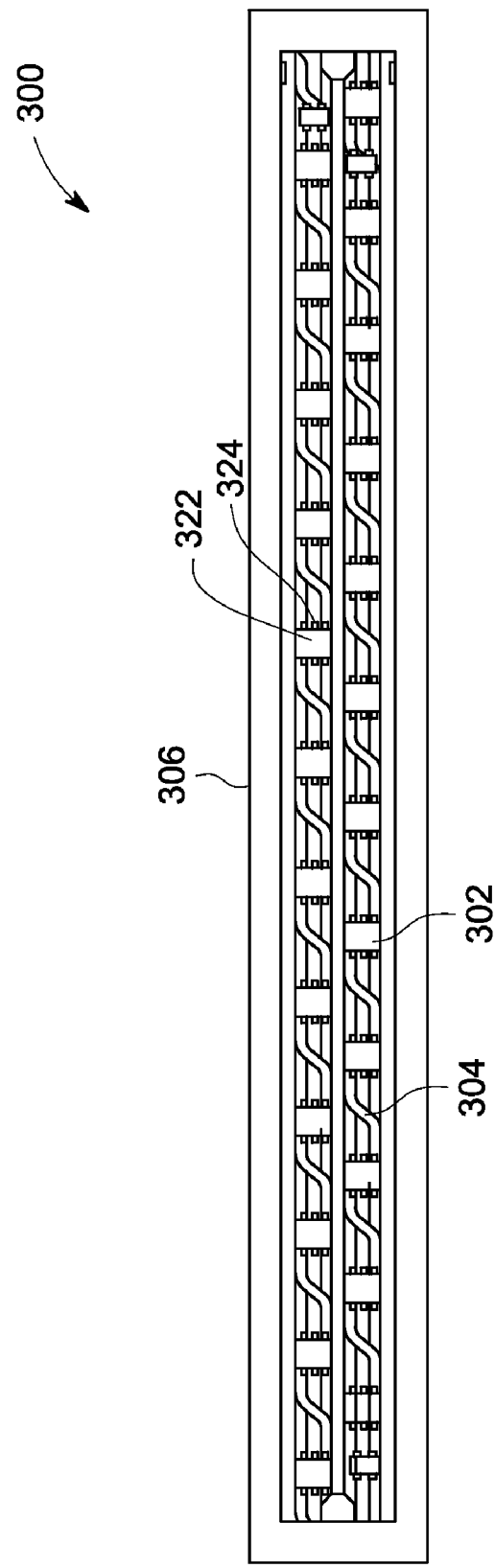
FIG. 3 is an exemplary modular solid state lighting device assembly that can be used in conjunction with the aspects of the disclosed embodiments.

Although the aspects of the disclosed embodiments will be generally described herein with respect to a refrigerator, it should be understood that the aspects of the disclosed embodiments can be applied to any appliance that incorporates or uses solid state device lighting. The exemplary refrigerator 100 shown in FIG. 1 will typically have one or more lighting elements 104. In this example, the lighting element 104 comprises lighting for a water/ice dispenser assembly 120 of the door 126 of the refrigerator 100. In alternate embodiments, the lighting element 104 can include, for example, interior lighting, exterior lighting, as well as lighting or illumination for the user interface or display 110. Referring to FIG. 3, in accordance with the aspects of the disclosed embodiments, the lighting element 104 will generally comprise one or more solid state lighting assemblies or modules 300. The aspects of the disclosed embodiments are not intended to be limited by the type or function of the SSL device used in an appliance 100.

Figure 2:
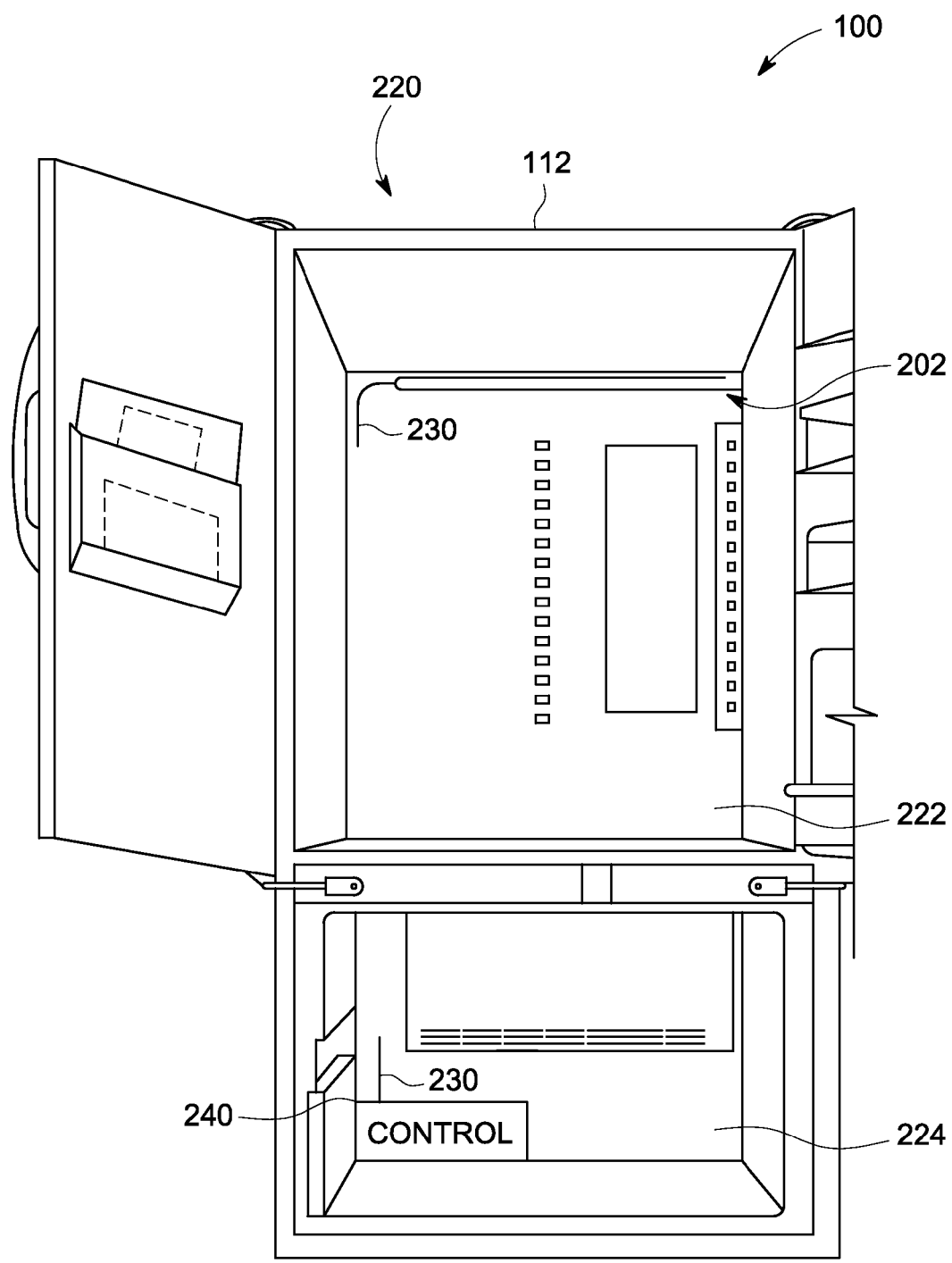

The refrigerator 100 generally includes a body or cabinet 112 that includes a top 114, a bottom 116 and opposed sides 118. As shown in FIG. 2, the top 114, bottom 116 and opposed sides 118 define an opening 220. Within the opening 220 is defined an upper compartment 222 and a lower compartment 224. In alternate embodiments the refrigerator 100 can include any suitable number of compartments. The refrigerator 100 in the embodiment shown in FIG. 1 includes a pair of doors 126, 128, where each door 126, 128 is attached to one of the cabinet sides 118 in a swinging relation to the door opening 220. A bottom door 124 for the lower compartment 224 is in the form of a pull-out drawer. The aspects of the disclosed embodiments are not limited to any particular number or style of doors, and in alternate embodiments, the refrigerator 100 can include any number or type of doors.

FIG. 2 illustrates another example of solid state lighting assembly 202 incorporated in the refrigerator 100. In this embodiment, the solid state lighting assembly 202 comprises lighting for an interior compartment 222 of the refrigerator 100. Although only one SSL assembly 202 is shown in FIG. 2, in alternate embodiments any suitable number of SSL assemblies 202 can be utilized. Additionally, the SSL assembly(s) 202 can be suitably sized, mounted within, positioned at or configured in any suitable manner and location of the refrigerator 100 for providing the required lighting. Although the potential lighting applications for solid state lighting in an appliance such as refrigerator 100 are numerous, for purposes of the description herein, the aspects of the disclosed embodiments will be described with respect to the SSL assembly 202.

FIG. 3 illustrates one example of an SSL module 300 that can be utilized in conjunction with the aspects of the disclosed embodiments. The lighting element 104 of FIG. 1 and the lighting assembly 202 of FIG. 2 can include on or more of the SSL modules 300, depending upon the application and size requirements for the particular lighting application. The SSL module 300 in this embodiment includes light emitting diodes (302 that are connected together by electrical traces 304 on a circuit board 306. Each light emitting diode 302 generally includes a light emitting section 322 for emitting light and an electrode section 324 for applying voltage to the light emitting section 322, in a known fashion. The number of LEDs 302 shown in FIG. 3 is merely exemplary, and in alternate embodiments, the SSL module 300 can comprise any suitable number of LEDs 302. The electrode sections 324 of the SSL module 300 are suitably connected to the power controller 240 shown in FIG. 2. This particular example of an SSL module 300 can be modularized, scaled, expanded, reconfigured or replaced individually to provide the required degree of lighting or display functionality. The aspects of the disclosed embodiments are not intended to be limited by the type of SSL module 300 used, and any suitable SSL module 300 with a rated current suitable for the particular application can be utilized. For example, in one embodiment, the SSL module 300 can comprises a string circuit of light emitting diodes that are chained together in a suitable fashion.

As is shown in FIG. 2, in one embodiment, a wiring harness, cabling or electrical connection 230 is provided that is used to connect the SSL assembly 202 to the power controller 240. In the embodiment shown in FIG. 2, the power controller 240 is located in a mechanical compartment in the bottom section of the refrigerator 100. In alternate embodiments, the electrical connection 230 and the power controller 240 can be suitably located in order to provide electrical power to the SSL assembly 202. The power controller 240 generally includes or is electrically connected to a power supply for rectifying and reducing commercial AC voltage into an operating voltage for the SSL assembly 202.

Figure 4:
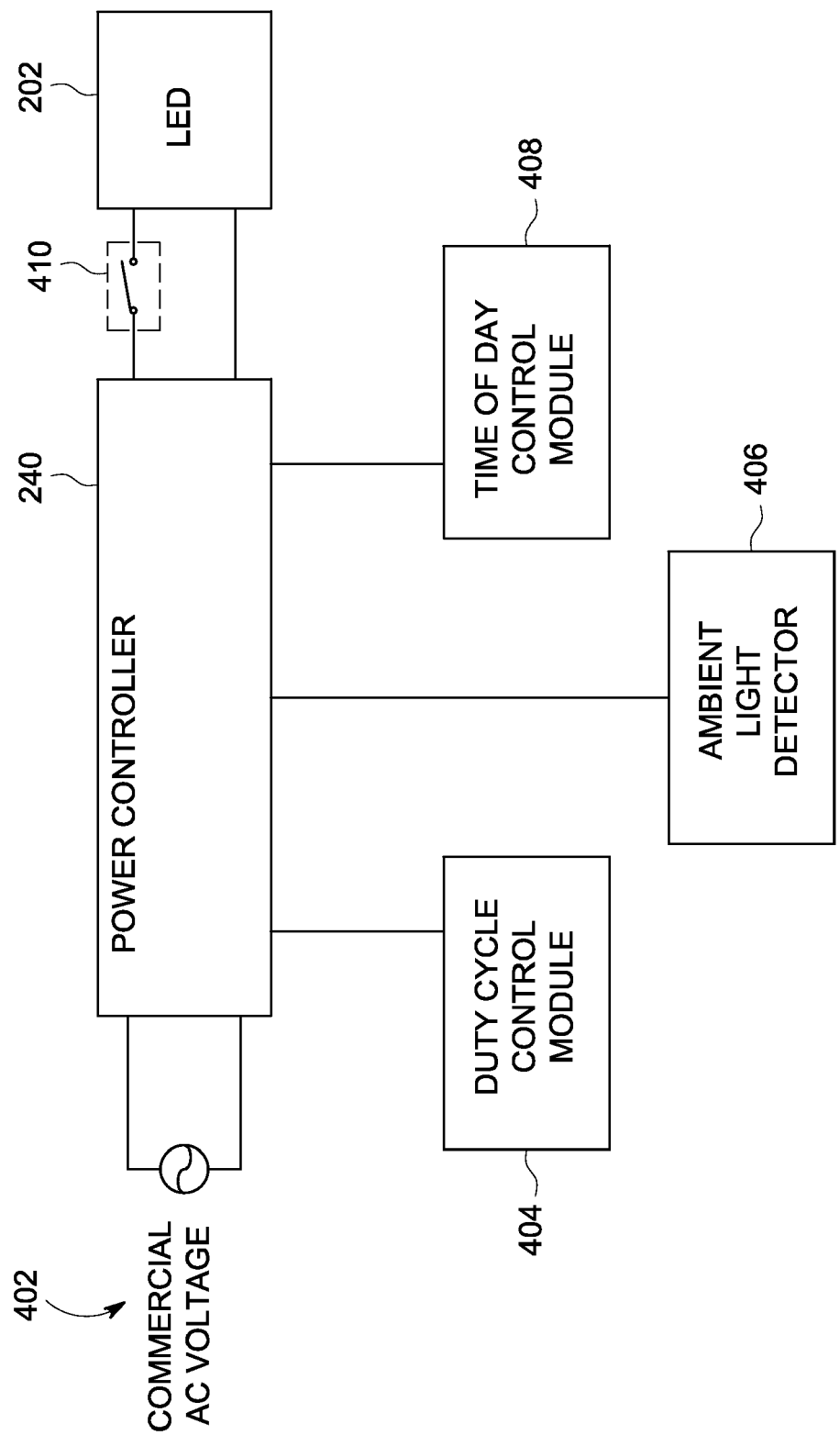
FIG. 4. is a schematic block diagram of a power control system for a solid state lighting device assembly incorporating aspects of the disclosed embodiments.

FIG. 4 illustrates one example of a power controller 240 that can be utilized in conjunction with the aspects of the disclosed embodiments. As shown in FIG. 4, the power controller 240 is connected to a power source 402, such as a commercial AC voltage source. The power controller 240 is generally configured to rectify and reduce the commercial AC voltage into an operating voltage for the SSL assembly 202. In one embodiment, a switch 410, such as for example a door switch, is electrically coupled between power controller 240 and the SSL assembly 202, and can selectively allow the operating voltage from the power controller 240 to be applied to the SSL assembly 202.

Figure 5:
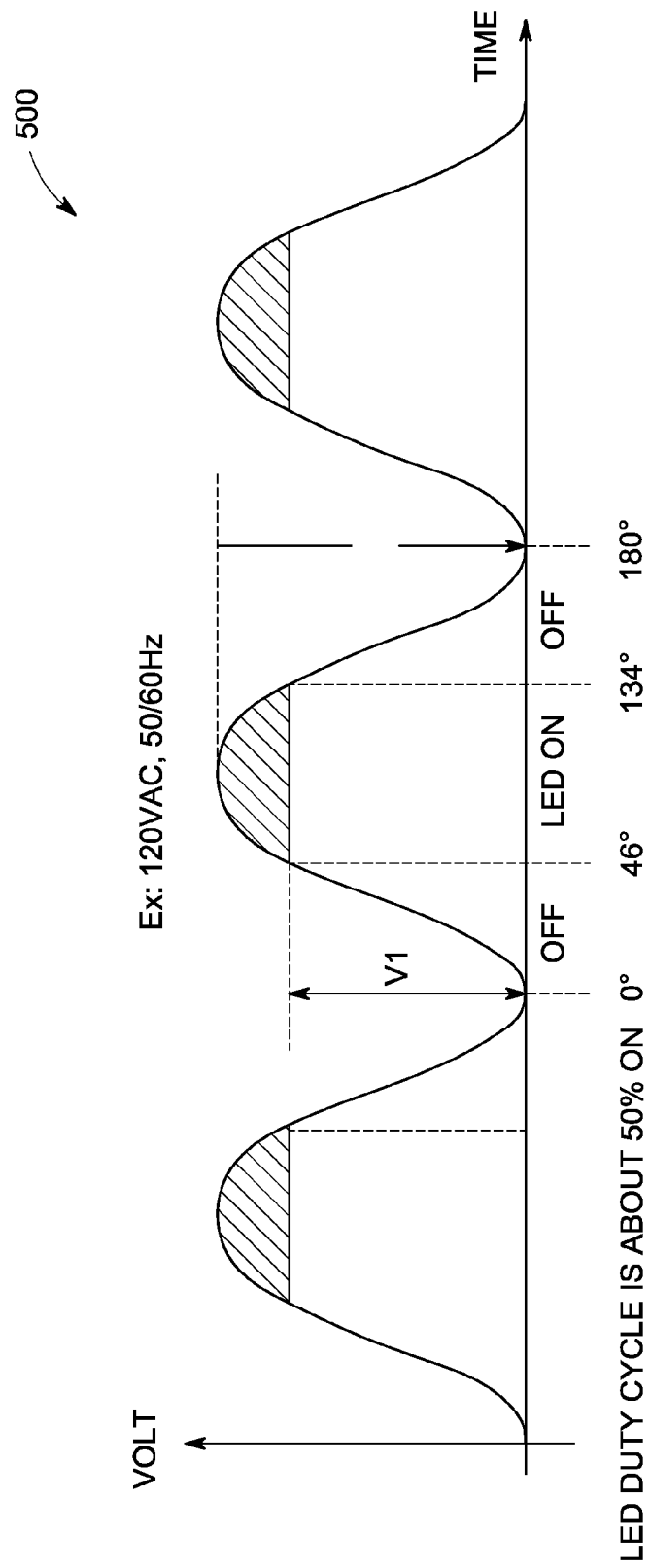
FIG. 5 is a graph of an exemplary power signal incorporating a duty cycle to be used in conjunction with the aspects of the disclosed embodiments.

In one embodiment, the power controller 240 includes or is coupled to a duty cycle control module 404. The duty cycle control module 404 is generally configured to control a duty cycle of a pulse modulated power signal that is provided by the power controller 240 to the SSL assembly 202, and thus control the illumination of SSL assembly 202. A duty cycle of a signal is generally defined as a function of the pulse width of the signal divided by the pulse repetition time or period of the signal. An exemplary modulated power signal 500 is shown in FIG. 5. In this example, the refrigerator 100 operates on 120 volts AC. The power controller 240 converts the 120 VAC power supply input into a sine wave 120 VDC signal at 120 Hz, which is supplied to the SSL assembly 202. The SSL devices 300 in the SSL assembly 202 are turned on when the DC voltage applied to them is greater than V1. In this example, the duty cycle is approximately 50%, meaning that each SSL device 300 in the SSL device lighting assembly 202 is switched ON for approximately ½ the time. It is a feature of the disclosed embodiments to adjust the duty cycle of the modulated power signal to the SSL lighting assembly 202 to control an ON and OFF time of the SSL lighting assembly 202. By alternating between an ON and OFF state, the power consumption of the SSL lighting assembly 202 is reduced, heat dissipation from the SSL lighting assembly 202 is reduced, and a perceived brightness of the SSL lighting assembly 202 is increased.

The human eye generally perceives the brightness of a light source by measuring the instantaneous light intensity. A similar phenomenon is known with respect to aircraft and allows warning lights for aircraft to be seen over great distances. Since the human eye perceives brightness by measuring the instantaneous light intensity, the application of a duty cycle to power control signal for a solid state lighting element such as the SSL assembly 202 shown in FIG. 2 will result in a greater level of perceived light. Solid state lighting devices are generally very sensitive to changes in voltage and a very small change in voltage can result in large changes in intensity. By using a duty cycle of a modulated power control signal to cycle the SSL assembly 202 of FIG. 2 between an ON state and an OFF state, the change from OFF to ON can result in a higher perceived brightness of the SSL assembly 202. Due to the phenomenon noted above, the short time period that the power control signal to the SSL assembly 202 will be OFF will not be perceptible to the human eye. Generally, any duty cycle having a repetition rate or frequency of approximately 30 hertz (Hz) or greater will allow the SSL assembly 202 to be perceived as continuously on, and can be used for other SSL device lighting applications as is described herein. Alternate waveforms may be used to enhance brightness at alternate frequencies to take advantage of the residual perceived light between the pulses. For example, a wave that is characterized by a high initial peak, followed by a lower level of light will help sustain the perceived brightness of the light by reinforcing the energy in the receptors in the eye. In one embodiment, the duty cycle control module 404 includes an oscillator or other modulator that can be used to set or adjust the frequency of the desired duty cycle. The duty cycle for the power control signal to the SSL assembly 202 can be a pre-determined duty cycle or manually adjusted.

The aspects of the disclosed embodiments can also consider certain environmental factors when establishing or setting a duty cycle for power control of the SSL assembly 202 in refrigerator 100. In one embodiment, an ambient light detector module 406 is coupled to, or is part of the power controller 240. The ambient light detector module 406 is generally configured to detect the ambient light levels in or around the refrigerator 100 and the SSL assembly 202 and cause the duty cycle control module 404 to adjust the duty cycle and/or frequency of the power signal for the SSL assembly 202 accordingly. For example, if the ambient light levels are very high, generally meaning that the refrigerator 100 is in a bright environment, the brightness of the SSL assembly 202 may need to be more intense or brighter, to be distinguishable. This could be significant when, for example, the SSL assembly 202 is for the display module 110 and the information must be able to be perceived in bright light conditions. In this situation, a duty cycle of a predetermined value and/or a higher frequency can be utilized that will intensify the perceived brightness of the SSL assembly 202 relative to a situation when the ambient light level is lower. If the ambient light levels are low, meaning lower light or darker lighting conditions, a lower duty cycle and/or frequency can be used.

In one embodiment, a Time of Day control module 408 can be coupled to or part of the power controller 240. The time of day control module 408 can be used to generally determine daytime and nighttime hours, and cause the duty cycle control module 404 to automatically adjust the duty cycle accordingly. In one embodiment the Time of Day control module 408 can also be coupled to the Duty Cycle Control module 404. During daytime hours, the duty cycle can be adjusted so that the perceived brightness is more intense, since daylight conditions will generally be understood to be brighter, while in the nighttime the duty cycle can be set at a lower repetition rate, as the ambient light levels will be lower. For example, in one embodiment a daytime duty cycle could be greater than 50%, while a nighttime duty cycle could be less than 50%. Alternatively, or in conjunction with adjusting the duty cycle, the rate or frequency of the power signal can also be varied. A higher frequency can be used to intensify the perceived brightness while a lower frequency can be used to diminish the perceived brightness.

In one embodiment, the number of SSL devices or modules 300 in the SSL assembly 202 can be doubled, while providing a power signal having a duty cycle of 50%. The SSL devices 300 in the SSL assembly 202 can be synchronized so that only ½ of the SSL devices 300 are on at any one time. This provides a steady power draw while providing a significant increase in perceived brightness, without increasing power requirements for the appliance. This addresses thermal management issues and power supply cost issues.

The aspects of the disclosed embodiments take advantage of the principle that the human eye perceives brightness by measuring the instantaneous light intensity of a light source. Applying a duty cycle to the power control signal for SSL devices in an appliance such as a refrigerator, increases the instantaneous power level and perceived brightness of the SSL device, while at the same time reducing the overall power consumption and heat dissipation. By lowering power supply usage and energy consumption costs, and reducing heat generation, lower cost components can be implemented in a refrigerator. This can result in an overall lower cost of the appliance and use thereof.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An appliance comprising:
    a cabinet;
    a solid state lighting device assembly integrated in the cabinet;
    a power controller coupled to the solid state lighting device assembly for supplying electrical power to the solid state lighting device assembly, the power controller being configured to provide a pulse modulated power signal with a variable current drive to the solid state lighting device assembly, the pulse modulated power signal having a duty cycle of 30 hertz or greater; and
    wherein each solid state lighting device in the solid state lighting device assembly cycles on and off in accordance with the duty cycle to allow the solid state lighting device to be perceived as continuously on.

2. The appliance of claim 1, wherein the appliance is a refrigerator.

3. The appliance of claim 2, wherein the solid state lighting device assembly is a display for the refrigerator, an interior lighting module or an exterior lighting module.

4. The appliance of claim 1, wherein the appliance is a dishwasher, air conditioner range or washer.

5. The appliance of claim 1, further comprising a duty cycle adjustment module coupled to the power controller, the duty cycle adjustment module being configured to adjust the duty cycle of the power signal for the solid state lighting device assembly in response to a determined environmental light state.

6. The appliance of claim 5, wherein the duty cycle adjustment module is user operated.

7. The appliance of claim 5, further comprising a time of day module coupled to the power controller, the time of day module controlling the duty cycle of the power signal based on a time of day.

8. The appliance of claim 7, wherein the duty cycle of the power signal during daylight hours has a higher rate, and the duty cycle of the power signal during nighttime hours has a lower rate.

9. The appliance of claim 1, wherein an OFF period of the duty cycle and an ON period of the duty cycle are not equal.

10. The appliance of claim 9, wherein the OFF period of the duty cycle has a longer time duration than the ON period of the duty cycle.

11. The appliance of claim 1, wherein the appliance further comprises an ambient light detector coupled to the power controller, the ambient light detector controlling a modulating input signal used to control a rate and period of the duty cycle, wherein in a detected bright light state, the modulating input signal controls the duty cycle to have a higher repetition rate than in a detected low light state.

12. The appliance of claim 1, wherein both the duty cycle and a frequency of the power signal are variable.

13. The appliance of claim 1, wherein the solid state lighting device assembly is an assembly of light emitting diodes, organic light-emitting diodes or polymer light-emitting diodes.

* * * * *